March 15, 1949.  T. H. FISHER  2,464,298
DOG
Filed July 16, 1945  2 Sheets-Sheet 1
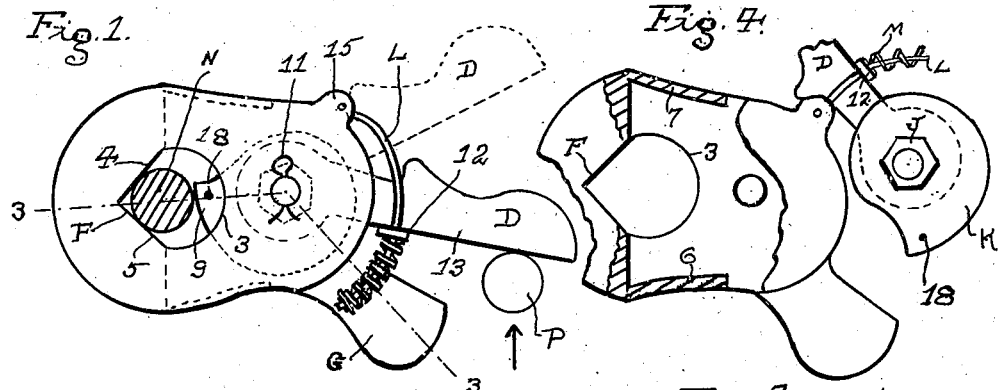
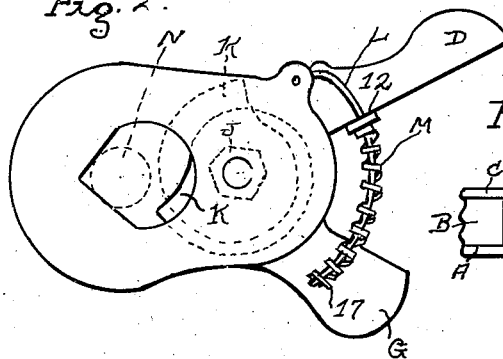
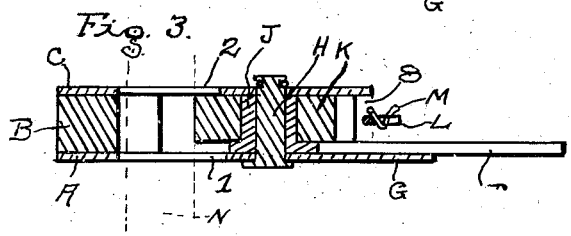
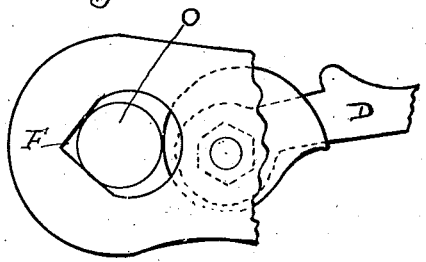
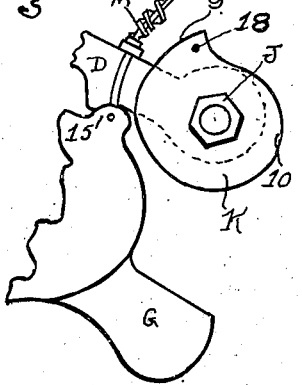
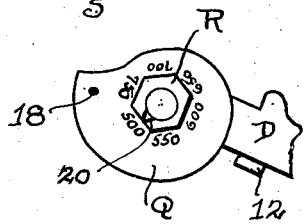
Inventor
T. H. FISHER
By Pattison, Wright & Pattison
Attorneys March 15, 1949. T. H. FISHER 2,464,298
DOG
Filed July 16, 1945 2 Sheets-Sheet 2

Inventor

T. H. FISHER

Pattison, Wright & Pattison
Attorneys

Patented Mar. 15, 1949

2,464,298

UNITED STATES PATENT OFFICE 2,464,298

DOG

Thomas H. Fisher, Springfield, Ohio

Application July 16, 1945, Serial No. 605,320

6 Claims. (Cl. 82—42)

The present invention relates to a clamping dog, and is suitable for use in connection with grinding operations, in combination with lathes, or in combination with any work which is to be rotated during operations thereon, but is not limited to any of these specific uses as other and further uses of the invention will be apparent to those skilled in the art.

One of the primary objects of the invention is the provision of a clamping dog which can be quickly and conveniently adjusted for use on work of varying diameters.

Another object of the invention is the provision of a clamping dog which upon being placed on the work automatically clamps itself thereto so that it will remain in its adjusted position for engagement by the work driving element.

Another and further object of the invention is a dog which will so clamp the work as not to slip.

A still further object of the invention is the provision of a dog which is composed of a minimum of parts and is therefore comparatively simple and cheap of manufacture and highly durable and efficient in operation.

Other objects, novel features of construction and improved results of the invention will appear in more detail from the following description when read in the light of the accompanying drawings wherein are illustrated several forms in which the inventive concept may be embodied.

In the drawings:

Fig. 1 is a top plan view of the dog in a closed position, that is, clamped upon a piece of work.

Fig. 2 is a top plan view of the dog in an open or unclamped position.

Fig. 3 is a vertical sectional view taken on the line 3—3 of Fig. 1.

Fig. 4 is a fragmentary top plan view, a portion of the view being broken away and shown in section, illustrating the position of the parts when the dog is adjusted for work of different diameters.

Fig. 5 is a fragmentary side view of the dog.

Fig. 6 is a fragmentary top plan view illustrating the dog clamped upon a work piece of larger diameter.

Fig. 7 is a fragmentary top plan view, similar to Fig. 4, illustrating the manner of adjusting the cam for work pieces of different diameters.

Fig. 8 is a top plan view of a cam of slightly modified construction.

Figure 9:
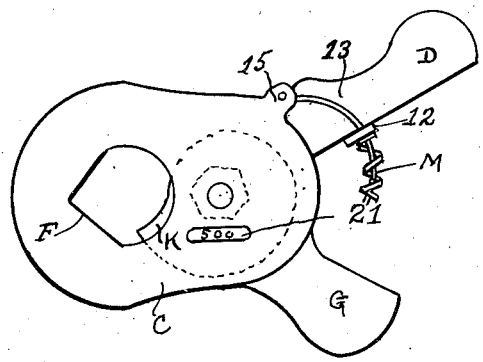
Fig. 9 is a top plan view illustrating a slightly modified form of dog utilizing the cam illustrated in Fig. 8.

The dog illustrated will operate on work pieces having diameters varying from one-half to three-quarters of an inch but it is to be recognized and understood that the dog could be made of any desired size to accommodate work of whatever desired diameter without departing from the inventive concept.

Describing the invention in detail and utilizing like reference letters and characters to designate similar parts throughout the description and referring first to Figs. 1 to 7 inclusive of the drawings it will be seen that the dog is composed of five primary pieces which comprise a base A, a spacer B, a cover C, a cam lever D and a cam K.

The base and cover can be spot-welded, riveted or otherwise suitably secured to the spacer B. The base and cover are provided with aligned openings 1 and 2 which are circular at one side as at 3 and at their other side are provided with oppositely inclined faces 4 and 5 to provide a V-shaped notch designated as an entirety by F. As will be seen by reference to Fig. 4 the spacer B has similarly oppositely inclined faces or walls which are in alignment with the walls 4 and 5 of the base and cover. Additionally the spacer has extending oppositely opposed side walls 6 and 7 to provide support and rigidity to the tool. The base at one end is provided with an extending handle G.

The construction thus far described is open at one end as at 8. The cam lever D extends through the open end 8 into the space between the base and cover and is rotatable therein on a pivot pin H. At its inner end and surrounding the pivot pin the lever is provided with a hexagonal nut J.

A cam K provided with a hexagonal shaped central opening of the proper size to telescopically receive the hexagonal nut portion J of the cam lever is positioned on the inner end of the cam lever and is rotatable therewith. This cam has a high side 9 and a low side 10.

The cam lever and the cam can be quickly removed from the casing, that is through the open outer end 8, by the removal of the pin H. This pin can be quickly removed by disconnecting the clip or cotter key 11.

When the pin H is removed the cam lever and cam can be swung outwardly through the open end 8 because the cam lever is pivotally connected to a spring guide L by reason of said guide passing loosely through an upstruck ear 12 carried by the handle portion 13 of the cam lever. This guide has one end pivotally mounted as at 14 between opposed ears 15 and 16 of the cover and base respectively. The manner in which the cam lever and cam can be swung outwardly as described is illustrated in Figs. 5 and 7 of the drawing.

The spring guide L extends through and beyond the cam lever ear 12 and carries on its outer end a washer or stop 17. A spring M surrounds the spring guide between said washer and cam lever ear 12 and tends to hold the cam lever in the position illustrated in dotted line in Fig. 1 and in full lines in Fig. 2 of the drawings.

The upper face of the cam is provided with an indicating marker such as a black or otherwise suitably colored dot 18 to indicate that said side of the cam should always be placed upward.

A work piece N of small diameter is illustrated in Fig. 1 as being clamped by the dog while in Fig. 6 a work piece O of substantially maximum diameter is illustrated as being clamped by the dog.

The elements comprising the invention having been described a description of its operation will be readily understood.

*Operation.*—When the dog is not in use the cam lever and cam are in the positions illustrated in full line of Fig. 2 of the drawings due to the action of the coil spring M. To insert the work piece through the dog opening the cam lever is grasped and moved as far as possible in the direction of the handle G. This operation can be performed with one hand of an operator by a squeezing action. The cam will then assume the position illustrated in dotted lines and will leave enough space between itself and the V-shaped slot for the passage of the work piece N which is illustrated in dotted lines. The dog will automatically clamp itself to the work piece by merely releasing the handle D. Upon such release the parts will move to the position illustrated in full lines in Fig. 1 of the drawings with the high side of the cam clamping the work piece.

The work driver is illustrated at P and engages the handle portion of the cam lever D and the direction of rotation of this driver is indicated by arrow and will of course tend to more tightly clamp the work piece N.

Obviously the position of the cam on the hexagonal nut J will have to be such as to clamp the particular diameter of work piece upon which an operation is to be performed in the machine. It may be necessary and especially so when the dog is first being used, to swing the cam lever out into the position illustrated in Fig. 4 several times so as to lift the cam from the nut and replace it in a different position. Figs. 4 and 7 make clear the different positions of the cam on the nut for clamping two work pieces of different diameters. Inasmuch however as the cam lever and cam can be quickly and conveniently swung out for removal and replacement of the cam adjustment of the dog for work pieces of varying diameters can be rapidly accomplished. This necessary trial of the cam in different positions does however require the expenditure of some time and to obviate even this small expenditure of time on the part of the operator a modified form of the invention is provided and is illustrated in Figs. 8 and 9 of the drawings, a description of which immediately follows.

The modified form of the invention appearing in Figs. 8 and 9 resides entirely in an arrangement to visually advise the dog operator of the diameter setting of the cam and to guide him in resetting the cam for work pieces of different diameters. In this form of the invention the cam Q is identical to the cam K with the exception that opposite each of the six straight faces of its hexagonal shaped central opening for the reception of the hexagonal cam lever nut numerals are placed upon the cam face. By reference to Fig. 8 it will be seen that these numerals run from 500 to 750. The cam lever hexagonal nut R is identical to the previously described nut J with the exception that its upper face opposite one of its six straight sides is provided with an indicating marker such as a V 20. Thus with the cam placed on the nut as indicated in Fig. 8 the cam is set for a work piece having a half inch diameter. As the cam is lifted from the nut and rotated toward the left each one-sixth of a turn in respect to the V marker 20 increases the setting of the cam .050 of an inch.

For the purpose of immediately advising the operator of the setting of the cam upon picking up the dog when it is not in use the cover C of the dog is provided with an opening 21 under which the cam dimensional markings pass. By reference to Fig. 9 of the drawings it will be seen that the dog which is not applied to any work and is therefore held in a fully closed position because of the spring M is set at 500 or for a work piece of one-half inch diameter.

Obviously the removal of the cam from the nut and the rotation of it one-sixth of a revolution in either direction sets the cam forward or rearwardly, as the case may be, 60 degrees.

Figure 10:
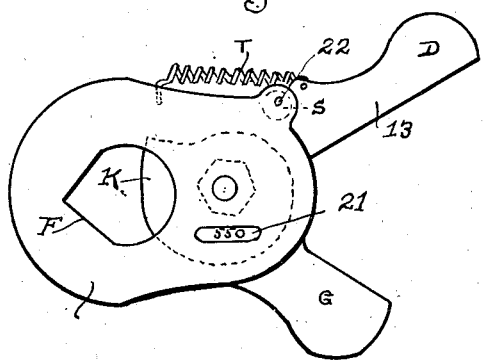
Fig. 10 is a top plan view of a modified form of the invention, the dog being shown in an open position.
Figure 11:
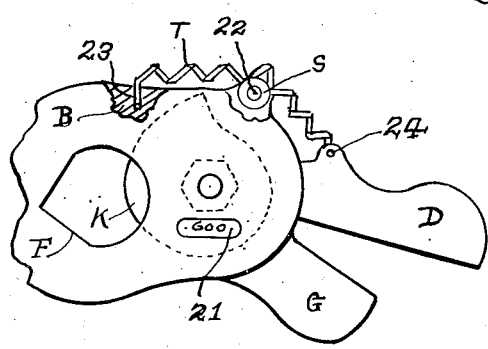
Fig. 11 is a fragmentary top plan view of the dog appearing in Fig. 10, the dog being shown in an open position and a portion of the view being broken away to better illustrate the invention.

The modification of the invention appearing in Figs. 10 and 11 of the drawings resides entirely in the spring which holds the dog normally in a closed position and the tension of which will automatically maintain the dog in clamped relationship to a work piece in the dog jaws. In this construction the pivotally mounted spring guide L has been eliminated. A roller S is rotatably mounted between the base and cover ears 15 and 16 on a shaft 22. Over this roller is trained a spring T having one end suitably secured as at 23 in the side wall of the spacer B while its other end is suitably secured as at 24 to the cam operating lever D. The construction appearing in these figures of the drawings provide an expansion spring type dog while the construction appearing in Figs. 1 to 9 inclusive illustrate a compression spring type dog.

The description of operation of the construction appearing in Figs. 1 to 7 inclusive will render obvious the mode of operation of the modified forms of the invention.

From the foregoing description it will be understood that the spring in all forms of the invention is utilized solely to hold the dog in position and to prevent it from falling off of a work piece when work is placed in the centers of a machine for rotation thereby. The actual clamping operation from the standpoint of clamping the work piece so as to rotate it is caused by the pressure exerted upon the cam lever by the work driver P.

The present improved dog does not require any change in the usual and normal position of the work driver as found on lathes, grinders and other machines which rotate work pieces. The dog is an improvement over dogs as now known and particularly the so-called set-screw dogs in that it has more gripping power than they and will serve the purpose of approximately six or seven of the ordinary set-screw V type dogs for the reason that the capacity of that type of dog is extremely limited and can not accommodate, because of lack of wide adjustability, work pieces of many different diameters. The present dog speeds of production as it requires only one hand for its operation and because its adjustability is so simple and rapid and eliminates the necessity of any wrenches or tools in effecting adjustment.

A dog can be built, without departure from the present inventive concept, to accommodate work pieces between any desired minimum and maximum diameters. There is no limit to the capacity of work piece size which can be accommodated by the dog.

Structural departures can be made from the precise arrangements illustrated in the drawings without departing from the inventive concept and the invention is to be limited only within the scope of the hereinafter and following claims.

I claim:

1. In a lathe dog or the like, a body member having a passageway therethrough providing a clamping jaw for a piece of work, a lever pivotally mounted for rotation on said body and provided with a finger projecting outwardly from the body, a cam carried by and rotatable with said lever and adapted to be projected across said passageway upon rotation of said lever about its pivot, said lever provided on one of its faces with an outwardly projecting nut having a plurality of side faces, said cam being provided with an opening of the same configuration of said nut and adapted to telescopically receive the nut whereby the cam is adjustable into a plurality of positions upon the lever, said cam adjustability selectively providing for an increase or decrease in the distance said cam is projected across the body passageway, and means for retaining said cam against displacement from said lever nut.

2. In a lathe dog or the like, a three-part body member comprising upper and lower plates separated by a spacer, a passageway through said member providing a clamping jaw for a piece of work, said passageway having a V-shaped portion a portion of the walls of which are formed by said spacer, a pivot pin passing through said member and having quick detachable connection therewith, a lever pivoted intermediate its length on said pin for rotation thereabout, said lever having an end exterior of the body member and an inner end within the body member, a cam carried by the inner end of said lever and adapted upon rotation of the lever to be projected across said body member passageway, the inner end of said lever and said cam being removable from the body member upon removal of the pivot pin, and said cam having quick detachable adjustable connection with said lever for making the dog capable of clamping work pieces of varying diameters.

3. A construction as defined in claim 1 wherein, the cam lever carried nut is of a hexagonal shape, an indicating marker opposite one of the side faces of said nut, diameter setting indicia on said cam opposite each of the faces of the nut receiving opening thereof, said cam being disposed within said body member, and said body member being provided with an opening through which said diameter setting indicia of said cam can be read.

4. In a lathe dog or the like, a body member having a passageway therethrough providing a clamping jaw, said body at one end and opposite said passageway provided with an elongated slot-like opening, a pivot pin extending through said body and adapted for quick removal therefrom, a cam lever pivoted on said pin for rotation thereabout, said lever extending into said body through the slot-like opening thereof, a cam carried by and rotatable with said lever and adapted to be projected across said body passageway upon rotation of said lever, said cam being adjustably connected to said lever for the purpose of increasing or decreasing the distance said cam is projected across said passageway upon rotation of the lever, a second pivot, said lever being rotatably supported on said second pivot to permit the lever to be swung outwardly from the body member through the slot-like opening thereof upon the removal of the pivot pin from the body member, and said outward movement of the lever permitting the free removal and replacement of the cam for adjustment thereof.

5. In a lathe dog or the like, a body member having a passageway therethrough providing a clamping jaw, said body at one end and opposite said passageway provided with an elongated slot-like opening, a pivot pin extending through said body and adapted for quick removal therefrom, a cam lever pivoted on said pin for rotation thereabout, said lever extending into said body through the slot-like opening thereof, a cam carried by and rotatable with said lever and adapted to be projected across said body passageway upon rotation of said lever, said cam being adjustably connected to said lever for the purpose of increasing or decreasing the distance said cam is projected across said passageway upon rotation of the lever, an elongated spring guide pivotally mounted on said body member and extending longitudinally of the slot-like opening of the body, said lever having an ear through which said spring guide loosely passes, a spring surrounding said guide and having one end in abutment with said lever ear, an abutment adjacent the free end of said guide for retaining the spring in under compressed engagement with said lever ear, said spring guide providing means permitting the cam to be swung outwardly through and beyond the elongated opening in the body upon removal of the lever pivot pin, and said outward movement of the cam permitting the cam to be removed from and replaced upon the lever for the adjustment defined.

6. In a lathe dog or the like, a clamping jaw for a piece of work, a lever pivotally mounted for rotation, a cam connected to and rotatable with said lever and having a cam surface opposed to said clamping jaw, the cam surface of said cam adapted to be rotated in respect to the clamping jaw by the rotation of said lever about its pivot, the cam lever being provided with a hexagonal shaped nut-like extension on one of its faces, and said cam being provided with a hexagonal shaped opening adapted to snugly telescopically receive the nut-like extension of the cam lever, such construction providing a rotatable adjustment of the cam in respect to the lever to render said dog capable of clamping work of varying diameters.

THOMAS H. FISHER.

REFERENCES CITED

The following references are of record in the file of this patent:

UNITED STATES PATENTS

| Number | Name | Date |
|---|---|---|
| 1,419,452 | Fraser | June 13, 1922 |
| 1,425,862 | Julin | Aug. 15, 1922 |
| 1,587,961 | Karle | June 8, 1926 |

FOREIGN PATENTS

| Number | Country | Date |
|---|---|---|
| 38,343 | Germany | Feb. 16, 1887 |
| 27,037 | Great Britain | 1908 |
| 64,742 | Switzerland | July 4, 1913 |